United States Patent
Nagano et al.

(10) Patent No.: US 7,246,270 B2
(45) Date of Patent: Jul. 17, 2007

(54) PROGRAMMABLE CONTROLLER WITH CPU AND COMMUNICATION UNITS AND METHOD OF CONTROLLING SAME

(75) Inventors: Eisuke Nagano, Tagata-gun (JP); Kenichiro Tomita, Tagata-gun (JP); Kazuya Sawa, Mishima (JP)

(73) Assignee: OMRON Corporation, Kyoto (JP)

( * ) Notice: Subject to any disclaimer, the term of this patent is extended or adjusted under 35 U.S.C. 154(b) by 531 days.

(21) Appl. No.: 10/444,922

(22) Filed: May 23, 2003

(65) Prior Publication Data

US 2003/0225813 A1 Dec. 4, 2003

(30) Foreign Application Priority Data

May 31, 2002 (JP) ............................. 2002-160808
May 23, 2003 (JP) ............................. 2003-145983

(51) Int. Cl.
*G06F 11/00* (2006.01)
(52) U.S. Cl. ...................................................... 714/43
(58) Field of Classification Search ................... 714/9, 714/36, 43, 44; 710/109, 302, 304; 713/100, 713/324
See application file for complete search history.

(56) References Cited

U.S. PATENT DOCUMENTS

| | | | | |
|---|---|---|---|---|
| 5,148,433 A | * | 9/1992 | Johnson et al. | 714/10 |
| 5,777,874 A | * | 7/1998 | Flood et al. | 700/82 |
| 5,790,775 A | * | 8/1998 | Marks et al. | 714/9 |
| 5,966,304 A | * | 10/1999 | Cook et al. | 700/82 |
| 6,047,222 A | * | 4/2000 | Burns et al. | 700/79 |
| 6,108,300 A | * | 8/2000 | Coile et al. | 370/217 |
| 6,148,410 A | * | 11/2000 | Baskey et al. | 714/4 |

(Continued)

FOREIGN PATENT DOCUMENTS

DE    19814096    10/1999

(Continued)

OTHER PUBLICATIONS

German patent application No. 10324380.1, Examination Report dated Sep. 13, 2005.

(Continued)

*Primary Examiner*—Robert Beausoliel
*Assistant Examiner*—Elmira Mehrmanesh
(74) *Attorney, Agent, or Firm*—Beyer Weaver LLP

(57) ABSTRACT

A programmable controller has two communication units connected to a same network and a CPU unit. These two communication units are both identified by same unit-identifying data such as node numbers and unit numbers and function such that one of them operates in an active mode and the other operates in a standby mode. Each of these communication units, when in the active mode, operates to carry out data exchanges with the CPU unit and other nodes connected to the network and, when in standby mode, is prevented from carrying out any data exchange with the other nodes connected to the network. When the communication unit in the active mode fails and goes down, the one in the standby mode is switched to the active mode and carries out the data change. This mode-switching operation is carried out in response to a command from the CPU unit although it may be so arranged that the communication units communicate with each other and switch their modes by informing the occurrence of a failure to the other unit.

11 Claims, 5 Drawing Sheets

U.S. PATENT DOCUMENTS

| | | | |
|---|---|---|---|
| 6,163,825 A * | 12/2000 | Wallach et al. | 710/302 |
| 6,523,140 B1 * | 2/2003 | Arndt et al. | 714/44 |
| 6,633,996 B1 * | 10/2003 | Suffin et al. | 714/4 |
| 6,640,314 B1 * | 10/2003 | Lelaure et al. | 714/11 |
| 6,711,698 B1 * | 3/2004 | Marbach et al. | 714/4 |
| 6,742,136 B2 * | 5/2004 | Christensen et al. | 714/5 |
| 6,871,296 B2 * | 3/2005 | Kashyap | 714/13 |
| 6,954,712 B2 * | 10/2005 | Bingham et al. | 702/123 |
| 6,954,881 B1 * | 10/2005 | Flynn Jr. et al. | 714/43 |
| 7,055,061 B2 * | 5/2006 | Nitta | 714/13 |

FOREIGN PATENT DOCUMENTS

| | | |
|---|---|---|
| JP | 64-088803 | 4/1989 |
| JP | 03/025502 | 2/1991 |
| JP | 08-234832 | 9/1996 |
| JP | 10-124138 | 5/1998 |
| JP | 2000-353105 | 12/2000 |
| JP | 2001-236103 | 8/2001 |
| JP | 2001-268092 | 9/2001 |
| JP | 2002-023813 | 1/2002 |
| JP | 2002-062903 | 2/2002 |
| JP | 2002-077215 | 3/2002 |

OTHER PUBLICATIONS

Japanese patent application No. 2003-145983, Examination Report dated Nov. 9, 2005.

Patent Abstracts of Japan, Publication No. 2001-156818, *Node, Transmission Method, And Communication Unit For PLC*, Yamada Hiroaki et al., published Aug. 6, 2001.

* cited by examiner

PROGRAMMABLE CONTROLLER WITH CPU AND COMMUNICATION UNITS AND METHOD OF CONTROLLING SAME

BACKGROUND OF THE INVENTION

This invention relates to a programmable controller, its CPU and communication units and a method of its control.

Programmable controllers (PLCs) are being used as control devices in factory automation (FA). Such PLCs are structured as an appropriate combination of a plurality of units such as a power source unit for supplying electrical power, a CPU unit for controlling the PLC as a whole, an input unit for inputting signals from switches and sensors positioned strategically for the FA devices, an output unit for outputting control signals to actuators or the like, and a communication unit for connecting to a communication network.

The control of a PLC by its CPU unit includes accepting signals inputted through the input unit into the I/O memory of the CPU unit ("IN-refresh"), carrying out a logical calculation according to a user program preliminarily registered in a user program language such as a ladder language ("calculation"), writing the result of such calculations in the I/O memory for transmitting it to the output unit ("OUT-refresh") and thereafter exchanging data through the communication unit with the other PLCs on the same communication network or through communication ports provided to the CPU unit with external devices ("peripheral processing") in a cyclic mode of operation. Operations of the IN-refresh and OUT-refresh are sometimes carried out together.

In order to improve the safety and reliability of a system, it has been known to prepare a network system in a double structure. Japanese Patent Publication Tokkai 2001-156818, for example, discloses a ring-shaped transmission system with a double-loop structure of optical cables. With such a double-loop structure, nodes such as PLCs connected to such a ring-shaped transmission route can maintain their mutually connected condition even if a portion of the transmission route happens to be broken and hence interruptions in communication due to such a breakage can be prevented and the reliability of the network is improved.

Each PLC is connected to the network through its communication unit (or network unit) and exchanges data with the other PLCs or nodes through this communication unit. Thus, interruptions in communication due to a breakage in the transmission route can be prevented by using a network system with a double loop structure but the problem of interrupted communication remains if an abnormal condition occurs in the communication unit itself because the nodes (such as PLCs) connected to the network through such a communication unit become unable to exchange data.

In view of the above, if a PLC system is required to be able to continue communication processes even in the presence of a trouble with a communication unit of the controller system with a redundant double loop structure, it has been necessary to double up the communication unit by transmitting the same data twice by the user program. Explained more in detail, this is done by providing the PLC with two communication units having different node numbers and different unit numbers. When such two communication units are used to exchange data with a different node by the so-called data link method, different memory areas (referred to as data link areas) within the CPU unit are used for the data exchange for the two communication units. For this reason, the CPU unit is required to carry out data exchanges and other processes with two communication units. In other words, the user program for the CPU unit must be created so as to carry out a similar process twice regarding the two different memory areas assigned to the two communication units when a data link area is to be accessed. This means that there is an increased load on the calculation process for the execution of such a user program.

A similar problem occurs when a user program is created for communicating with other nodes connected to the network. When a user program is created by using commands (communication commands) for transmitting and receiving messages to and from another node, the node number and the unit number associated with the addressee communication unit must be written in as the operand for the communication command. Thus, the user program must be prepared such that each message will be transmitted to two different communication units by specifying the node number and the unit number of each of them.

If each communication unit is thus doubled up at each node on the network, communication need not be interrupted even when there is an abnormality situation in one of the networks, but the user program for the CPU unit must be executed twice for each unit.

SUMMARY OF THE INVENTION

It is therefore an object of this invention to provide a programmable controller with CPU and communication units and a method of its control such that a highly reliable system with doubled-up communication units can be formed with the load on the CPU unit not increased but remaining about the same as if the system were operating with a single communication unit and that user programs can be prepared as simply as for a single communication unit.

A programmable controller embodying this invention is characterized not only as comprising two communication units connected to a same network and a CPU unit but also wherein these two communication units are both identified by same unit-identifying data and function such that one of them operates in an active mode and the other operates in a standby mode. Each of these communication units, when in the active mode, operates to carry out data exchanges with the CPU unit and other nodes connected to the network and, when in the standby mode, is prevented from carrying out any data exchange with the other nodes connected to the network. When the communication unit in the active mode fails and goes down, the one in the standby mode is switched to the active mode and carries out the data change, and this mode-switching operation is carried out in response to a command from the CPU unit although it may be so arranged that the communication units communicate with each other and switch their modes by informing the occurrence of a failure to the other unit.

In the above, the unit-identifying data are address data such as node numbers and unit numbers. Network numbers for identifying networks where there are a plurality of networks may also be included in the unit-identifying data. In the case of an ethernet unit, an IP address is additionally set. In summary, any data will do if they can distinguish and specify communication units on the network.

Since the two communication units of a programmable controller according to this invention have the same unit-identifying data (that is, the same address data such as the node numbers and the unit numbers), the user program for exchanging data with the other nodes by data link operations may be created as if there were only one communication unit without being doubled up. In other words, prior art user programs need not be modified as communications are doubled up. Moreover, since the two communication units have the same address data, user programs for sending messages to the programmable controller from the other nodes can be created as if these is only one communication unit that is not doubled up. Thus, prior art user programs can be used without being modified.

Although both of the two communication units have the same unit-identifying data and hence both can receive data transmitted from the other nodes, since each knows whether it is in the active or standby mode, only the active one of them serves to carry out normal processes corresponding to the received data. Even if the active unit fails and goes down, the other unit can be activated and directly continue to exchange data and carry out communications since the two units have the same unit-identifying data.

In the aforementioned active mode, each of the communication units is adapted to carry out the data exchanges with the CPU unit and the other nodes by data link operations in a suitable order, the CPU unit storing the parameters which are necessary for such data link operations. It may be by receiving such parameters from the CPU unit that the communication unit in the standby mode, when it is switched to the active mode, becomes capable of carrying out the data link operations.

In the above, "data link" means the operation and function of constantly holding data (link data) on specified areas of internal memories of nodes (such as PLC) in common among the nodes on a network such that no user-prepared communication program is needed for sharing data among the nodes. Once new data are written in the output area of one's own node, such data are automatically reflected in the input areas of the other nodes such that data can be commonly owned among the nodes on the same network. Since communications among the nodes connected to a network are carried out through communication units, data stored in the output area of a CPU unit for its own node for carrying out data link operation are transmitted first into a memory within the communication unit and then to the other nodes. Likewise, data transmitted from the other nodes are once stored in a memory within the communication unit and then transmitted to the input area for the other nodes of the CPU unit. The output area for its own node and the input area for the other nodes within the CPU unit for carrying out data link operations are together referred to as the data link area.

Since the parameters required for data link operations are stored in the CPU unit, the communication unit which is newly activated from its standby condition can obtain these parameters from the CPU unit to resume the data link operations under the same conditions as before the switching of the modes. Thus, there is no need for the communication unit in the standby mode to obtain such parameters or to transfer data from the other communication unit in the active mode and hence the load of operation can be reduced.

It is preferable when a communication unit switches from the standby mode to the active mode as explained above that no data transmission be carried out thereby to the other nodes during the data exchange corresponding to the first data link operation after the mode switch. This is because the memory becomes cleared as a reset signal is outputted for the purpose of the mode change such that incorrect data may be transmitted if data transmission is effected to the other nodes before data are exchanged with the CPU unit. This, however, is not essential because the system may be arranged such that data exchange with the CPU unit will be carried out first. In such a system, data transmission to the other nodes can be carried out even from the first time without causing any error. Moreover, the system may be so arranged that the mode changes are effected without a restart and that the same set of data for the active mode may be saved in the memory even in the standby mode. With a system thus arranged, too, data may be transmitted to the other nodes without causing any error even from the first time immediately after the mode change.

The invention also relates to a CPU unit of a programmable controller having two communication units connected to a same network, characterized as comprising means for exchanging data in an active mode through one of the communication units with other nodes also connected to the same network but not through the other of the communication units in a standby mode. It also has the function of judging the presence of an abnormal condition of the communication units and, if the active communication unit is thereby judged to have failed with an abnormal condition and the other communication unit in the standby mode is judged to be functioning normally, restarting the active communication unit, restarting the other communication unit in the standby mode and then starting up the standby communication unit into the active mode. In the above and hereinafter, the process of "restarting" a communication unit means to transmit a command to it to have its hardware reset.

After the active communication unit is thus restarted, it may be started up in the standby mode at a specified timing such that the doubled-up structure can be maintained. Although there is no stringent requirement on this timing after the restart, it is preferable to effect this start-up process after the standby communication unit is restarted and then started-up. It should be noted that such restart and start-up operations are carried out where there is an abnormal situation occurring in a communication unit which has been operating normally. If this abnormal situation is a result of a hardware trouble, the unit cannot be started up. In such a situation, a restart command is transmitted but the command to start it up may not be transmitted subsequently.

The invention further relates to a method of controlling a programmable controller comprised of two communication units connected to a same network and a CPU unit. The method of this invention may be characterized as comprising the steps of assigning same unit-identifying data to both of these two communication units, causing one of these communication units in an active mode to carry out data exchanges with the CPU unit and other nodes connected to the same network, preventing the other of the communicating units in a standby mode from carrying out data exchanges with these other nodes, and switching the standby communicating unit to the active mode, if the active communication unit fails, and causing the communication unit activated from the standby mode to carry out these data exchanges.

DETAILED DESCRIPTION OF THE INVENTION

Figure 1:
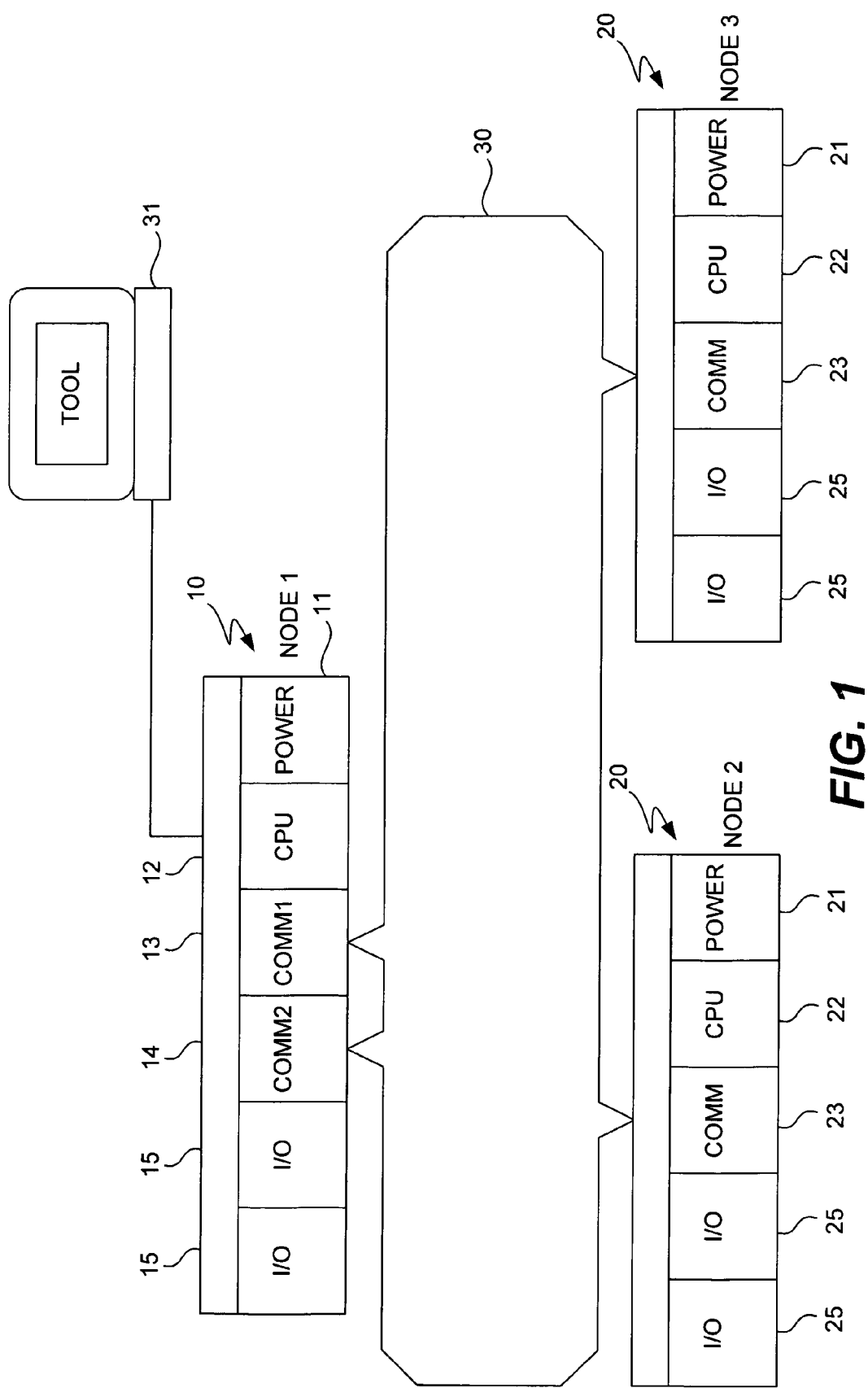
FIG. 1 is a block diagram of a network system including a programmable controller embodying this invention.

The invention is described next by way of an example. FIG. 1 shows an example of network system structured by using a programmable controller 10 embodying this invention in addition to programmable controllers 20 of a prior art type connected to a transmission route (a communication circuit) 30 arranged in a ring form as described, for example, in aforementioned Japanese Patent Publication Tokkai 2001-156818. This example, however, is not intended to limit the scope of the invention. A network according to this invention may be formed without any prior art programmable controllers (such as indicated by numeral 20) involved but by using a doubled-up PLC 10 of this invention at every node.

Each of the prior art PLCs 20 includes a power source unit (POWER) 21 for supplying electrical power to each of its units, a CPU unit 22 for executing a user program and cyclically carrying out the I/O refresh and/or peripheral processing, a communication unit (COMM) 23 connected to the communication circuit 30 for carrying out communications with the other nodes, and an I/O unit 25 for connecting input and output apparatus. These units are connected through a system bus. Units of other kinds are available and the number of units to be connected may be increased or decreased, if necessary. Detailed description of the prior art PLC 20 is omitted as being well known.

The PLC 10 embodying this invention also includes a plurality of units and its structure is basically the same as that of the prior art PLC 20 described above. Two communication units (the first communication unit (COMM 1) 13 and the second communication unit (COMM 2) 14 for communicating with the other nodes are connected to the same network (the communication circuit 30) to form a doubled-up pair of communication units. In addition, the PLC 10 includes a power source unit 11 for supplying electrical power to each of the units of which the PLC 10 is comprised, a CPU unit 12 for executing a user program and cyclically carrying out the I/O refresh and/or peripheral processing, and an I/O unit 15 for connecting input and output apparatus. These units are connected through a system bus. Units of other kinds are also available and the number of units to be connected may be increased or decreased, if necessary.

The first and second communication units 13 and 14 are of an identical internal structure. When the system is in action, one of them becomes active while the other remains inactive, or in a standby condition. When the data link function is being run, one of the communication units which is active serves to exchange data with the CPU unit and to carry out data exchanges with other nodes connected to the network (the communication circuit 30). If an abnormal condition occurs to the active communication unit, the other communication unit in the standby condition becomes active in response to a command from the CPU unit and resumes the ongoing processes.

The two communication units 13 and 14 have the same address data for identifying them, that is, their node numbers (Node 1 in the example of FIG. 1) and their unit numbers are the same. These address data may be set by using an address-setting switch (not shown) which may be a rotary switch provided to the communication units. Alternatively, a setting tool 31 may be used to store address data at a specified memory area of the communication unit.

When one of the two communication units 13 and 14 is active and exchanges data with the CPU unit while carrying out its data link function, the memory assignment for the data link operation is made on the basis of its unit number. Since both the first and second communication units 13 and 14 have the same unit number, however, the same memory area can be accessed for the data exchange no matter which of the two communication units 13 and 14 happens to be active, the other being in the standby condition. Since the node numbers and the unit numbers are also the same between the two communication units 13 and 14, the other party of communication (say, in a data communication with another node also connected to the same network) can transmit messages and responses to the same address whether or not a different one of the communication units 13 and 14 has become active.

Thus, user programs for accessing data link areas can be created without distinguishing between the two communication units 13 and 14. User programs to be used by the CPU unit of a different node for communicating with Node 1 (where the first and second communication units 13 and 14 are set) need to use only one address (the same node number and the same unit number set for both the first and second communication units at Node 1). This is basically like processing a prior art PLC (like the PLC 20 shown in FIG. 1) provided with a single communication unit. In other words, there is no need to run the same program twice by changing only the address.

Since the two communication units 13 and 14 have the same node and unit numbers, any data sent to their common address through the network can be received by both but since each of them knows whether it is active or in the standby condition, each can carry out an appropriate process according to the condition in which it is found.

Figure 2:
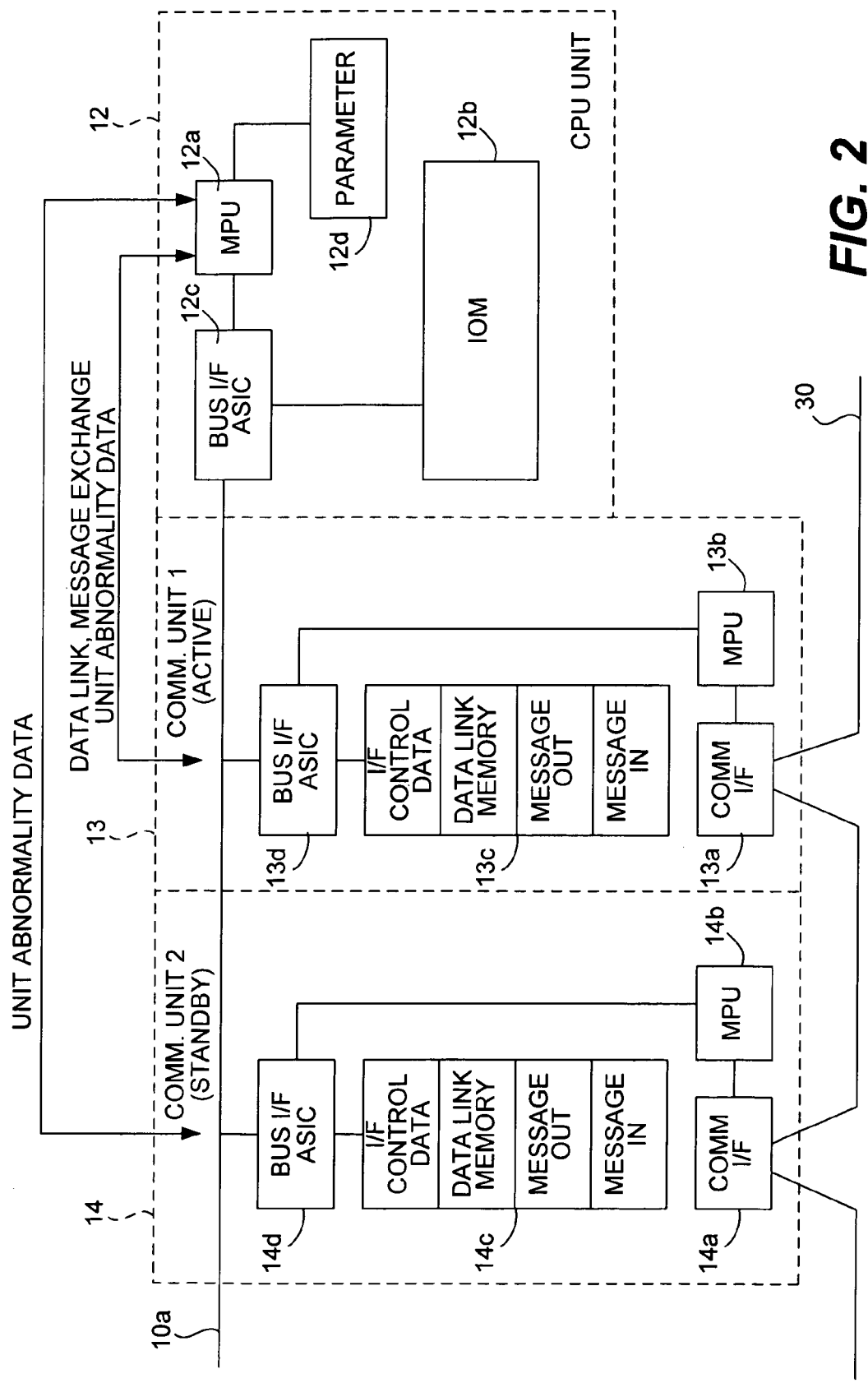
FIG. 2 is a block diagram of a portion of the embodiment of this invention.

Next, the internal structures of the CPU unit 12 and the first and second communication units 13 and 14 will be explained together with their actual operations. As shown in FIG. 2, the CPU unit 12 is provided with a MPU 12a for carrying out the I/O-refresh and the peripheral processing and an IO memory 12b for storing IO data. The MPU 12a and the IO memory 12b are both connected to a system bus 10a through a bus interface 12c so as to be able to exchange data with other units through the system bus 10a. The CPU unit 12 is also provided with a parameter memory 12d for storing a data link setting comprising parameters such as memory assignment data necessary for the data link operation. Such hardware structure is similar to prior art structures and hence no detailed account will be presented.

As explained above, the first and second communication units 13 and 14 are structured identically, each having a communication interface 13a or 14a for controlling communications, a MPU 13b or 14b for carrying out various processes and a memory 13c or 14c connected to the system bus and being provided with an interface ASIC 13d or 14d for transmitting and receiving data.

The memories 13c and 14c are each provided with a received message memory area (MESSAGE IN) for storing messages received through the communication interface 13a or 14a, a transmitted message memory area (MESSAGE OUT) for storing transmitted messages obtained from the CPU unit 12 through the system bus 10a, a data link memory area (DATA LINK MEMORY) for temporarily storing data to be data-linked, and an area (I/F CONTROL DATA) for storing control data for the interface. The interface control data areas may store, for example, assignment data for the memory addresses in the IO memory for data exchanges. Areas within the IO memory storing data for itself can be identified from the interface control data.

Next, the functions of the MPUs 13b and 14b are explained. When they are active, they operate as an ordinary communication unit, accessing the memories 13c and 14c and carrying out data-link processing and message exchanges while controlling the communication interfaces 13a and 14a. In other words, they can exchange data with the data link area of the IO memory 12b of the CPU unit 12 according to a memory area assignment which has preliminarily been set and also with the other nodes by carrying out the data-link processing, and the CPU units of different nodes can thus own data in common. The message exchange processes can be carried out by the so-called message service function, that is, by carrying out communication commands (commands for transmitting and receiving messages to and from different nodes) included in the user program for exchanging data with a specified node at a required time. When active, the first and second communication units 13 and 14 each serve to check the presence of an abnormal condition within itself and to communicate to the CPU unit 12 if an abnormal condition is detected. When in the standby condition, they do not carry out the data-link processing or the exchanges of messages carried out by the active MPU but repeat diagnostic tests for a failure. If an abnormality is detected by this diagnostic test, the detection is communicated to the CPU unit 12.

There are three kinds of abnormal conditions that may be detected by the communication units, occurrence of abnormality in a communication unit in the active condition, occurrence of abnormality in a communication unit in the standby condition and when the unit is removed while the power source is in the switched-on condition ("online exchange").

Abnormal conditions in an active communication unit include the "watchdog timer up (WDTUP)" of the communication unit, abnormalities in the transmission part of the communication unit and hardware abnormalities of the communication unit. These abnormalities can be detected from the bus interface control data. Abnormal conditions in a communication unit in the standby condition include the watchdog timer up (WDTUP)" of the communication unit and hardware abnormalities of the communication unit. These are also detectable from the bus interface control data. When an abnormality is detected in the communication unit in the standby condition, the switching between the active communication unit and the standby communication unit is naturally not effected. Since the doubled-up condition cannot be maintained in such a situation, an abnormality in doubling-up is communicated instead in such a situation. An online exchange of an active communication unit is likely to occur when the communication unit is exchanged for a maintenance inspection or a periodic exchange. When an online exchange is carried out on an active communication unit, the user may make use of a tool to communicate to the CPU unit 12 regarding the start of the online removal and attachment such that the CPU unit 12 is made aware of the condition under which the doubled-up communication condition cannot be maintained. In response, the CPU unit 12 activates the communication unit which has been in the standby condition. Moreover, the CPU unit functions such that the bus abnormality which would normally occur when a unit is removed and attached while the power source is in the ON condition will not result when the communication unit is removed and attached.

Thus, communications are not interrupted since the standby communication unit is activated when an abnormality occurs in the active communication unit, and the PLC 10 can continue its communications as well as its controls and operations. The occurrence of such an abnormal condition can be communicated through the network (the communication route 30) to the other nodes and the tool. Prior art technologies may basically be used for the function of detecting abnormal conditions itself.

Figure 3:
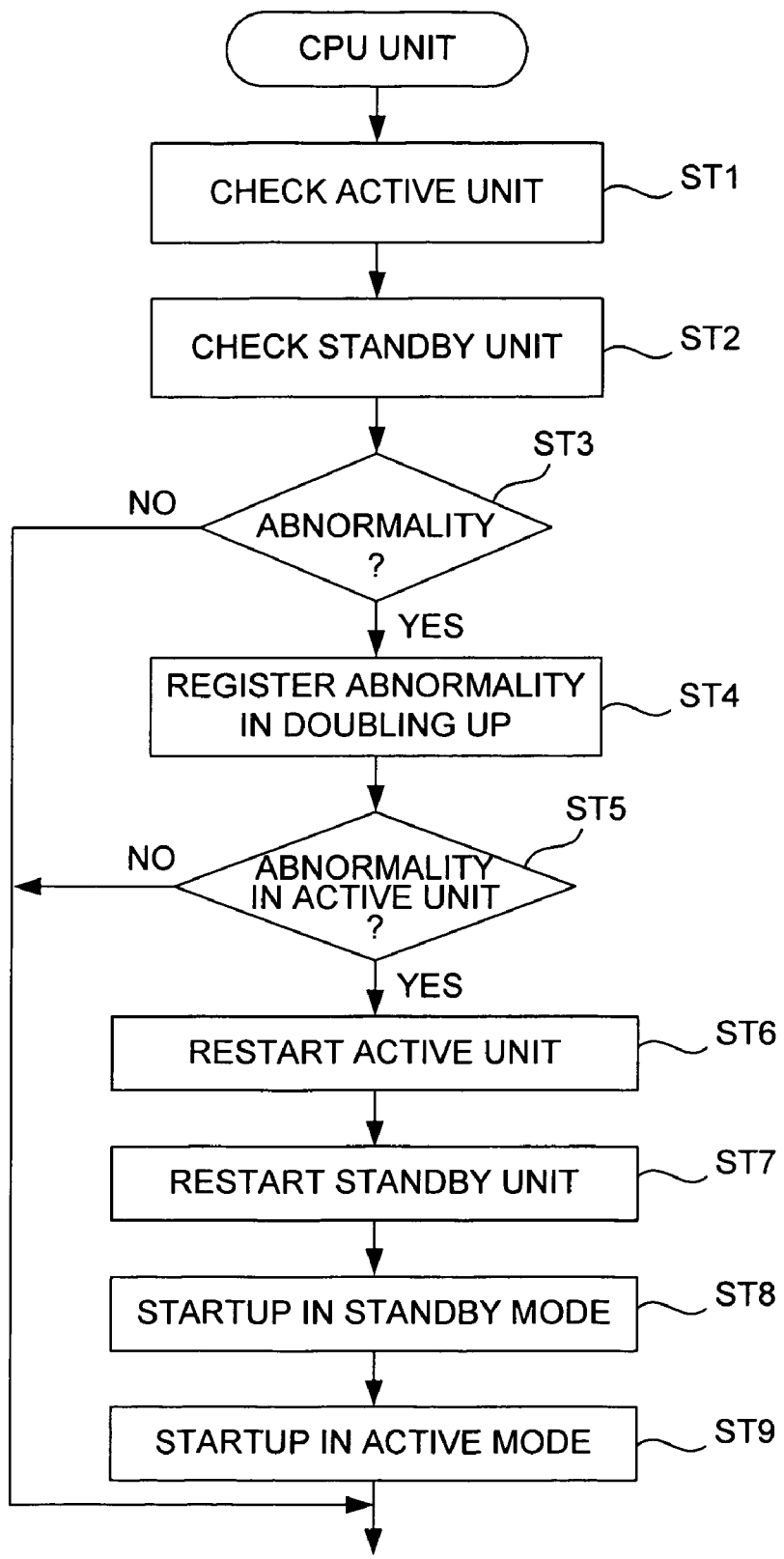
FIG. 3 is a flowchart of the operations of the CPU unit.

As explained above, the CPU unit 12 serves to monitor for the occurrence of an abnormal condition in the first and second communication units 13 and 14 and carries out a switching operation (between active and standby conditions) when an abnormal condition is detected in the active one of the communication units 13 and 14. These operations of the CPU unit 12 are explained next with reference to the flowcharts of FIGS. 3 and 4. In this explanation, it is assumed that the first communication unit 13 is initially active and the second communication unit 14 is in the standby condition.

The CPU unit 12 checks for an abnormal condition of the active first communication unit 13 (Step ST1) and then that of the second communication unit 14 in the standby condition (Step ST2). If no abnormal condition is detected in either of the communication units 13 and 14 (NO in Step ST3), the checking process for the time is completed. If an abnormal condition is detected in either of the communication units 13 and 14 (YES in Step ST3), this abnormality (in the sense of failure to maintain the communication units doubled up) is registered in a memory that is accessible to the tool (Step ST4). If the abnormality condition is only in the active first communication unit 13 (YES in Step ST5), a restart operation as explained above is carried out on the first communication unit 13 (Step ST6) to have its hardware reset and another restart operation is carried out on the second communication unit 14 in the standby condition (Step ST7) to have its hardware reset.

Figure 4:
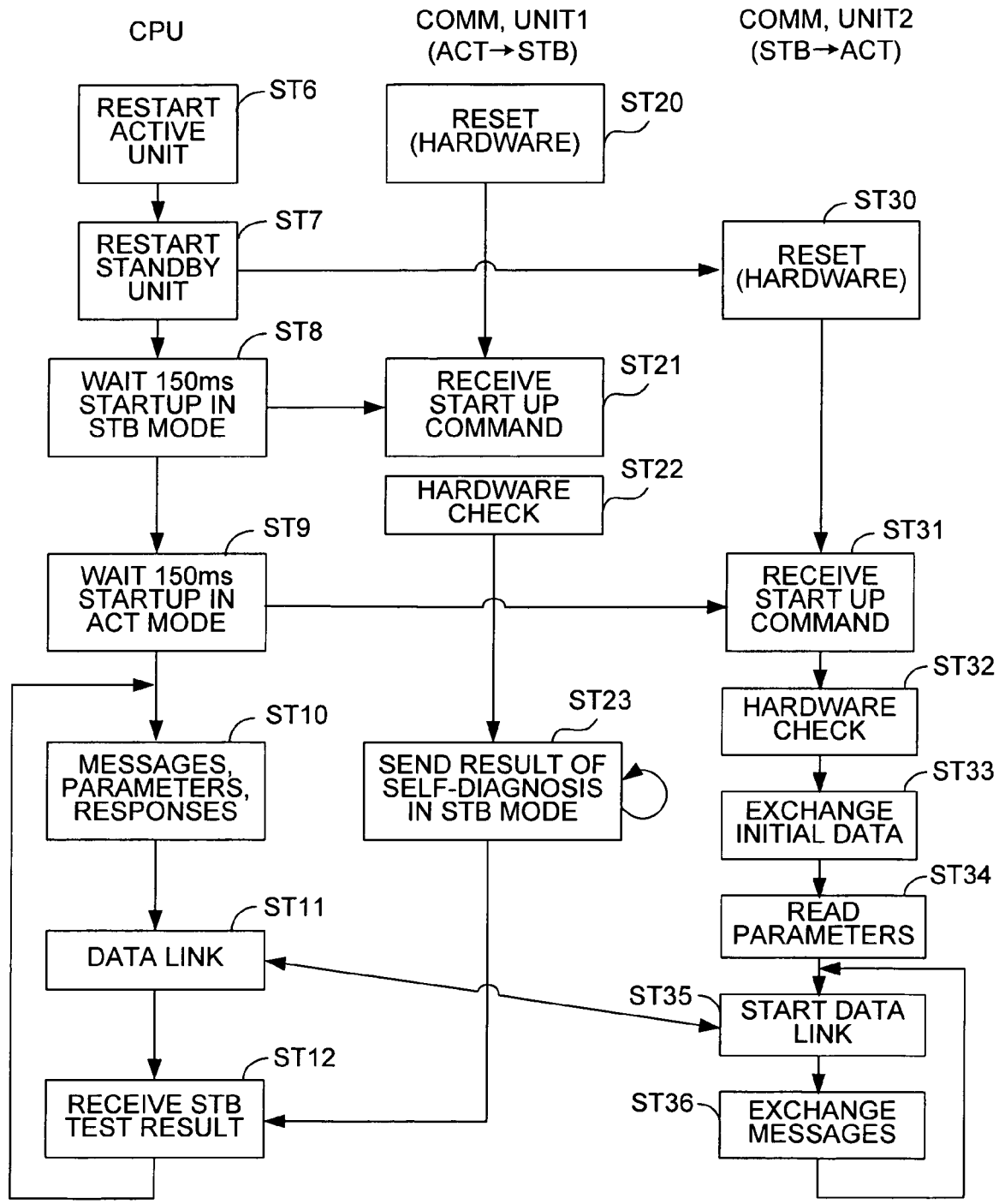
FIG. 4 is a flowchart of the operations by each unit when active and standby conditions are switched.

In response to these restart operations, the first and second communication units 13 and 14 carry out their own restart operations (Steps ST20 and ST30) as shown in FIG. 4, effecting memory-clear and other initialization processes. Thereafter, the first communication unit 13 which has been active is started up in the standby mode (Step ST8) and the second communication unit 14 which has been in the standby condition is started up in the active mode (Step ST9).

As the first communication unit 13 receives this restart command in the standby mode (Step ST21), a hardware check (or self-diagnosis) is carried out (Step ST22). If it is found to be normal, it starts up in the standby mode and continues thereafter to carry out operations for that mode (Step ST23), that is, it continues to carry out self-diagnosis operations to determine the presence or absence of an abnormal condition and reports the result to the CPU unit 12.

As the second communication unit 14 receives the restart command in the active mode (Step ST 31), it too carries out a hardware check (self diagnosis) (Step ST32). If it is found to be normal, it starts up in the active mode, exchanging initial data with the CPU unit 12 (Step ST33) and reading out necessary parameters (data link setting) on the basis of the initial data which have been received (Step ST34). Thereafter, the second communication unit 14 continues operations in the active move, carrying out data link processing by repeatedly carrying out data exchanges with the CPU unit and the other nodes (Step ST35) and message exchange operations with the other nodes (Step ST36). Although omitted from the flow chart of FIG. 4, it also has the functions of continuing to check the presence or absence of an abnormal condition and communicating to the CPU unit 12 if an abnormal condition is detected.

After active and standby conditions of the communication units 13 and 14 are switched in Steps ST6-ST9 explained above, the CPU unit 12 carries out the normal processing such as analyzing the messages received from the active communication unit to carry out processes specified therein and returning responses thereto (Step ST10). It also carries out data changes in connection with the execution of its data-link function with the active second communication unit 14 (Step ST11) and serves to receive the results of self-diagnosis transmitted from the first communication unit 13 now in the standby condition (Step ST12).

Figure 5:
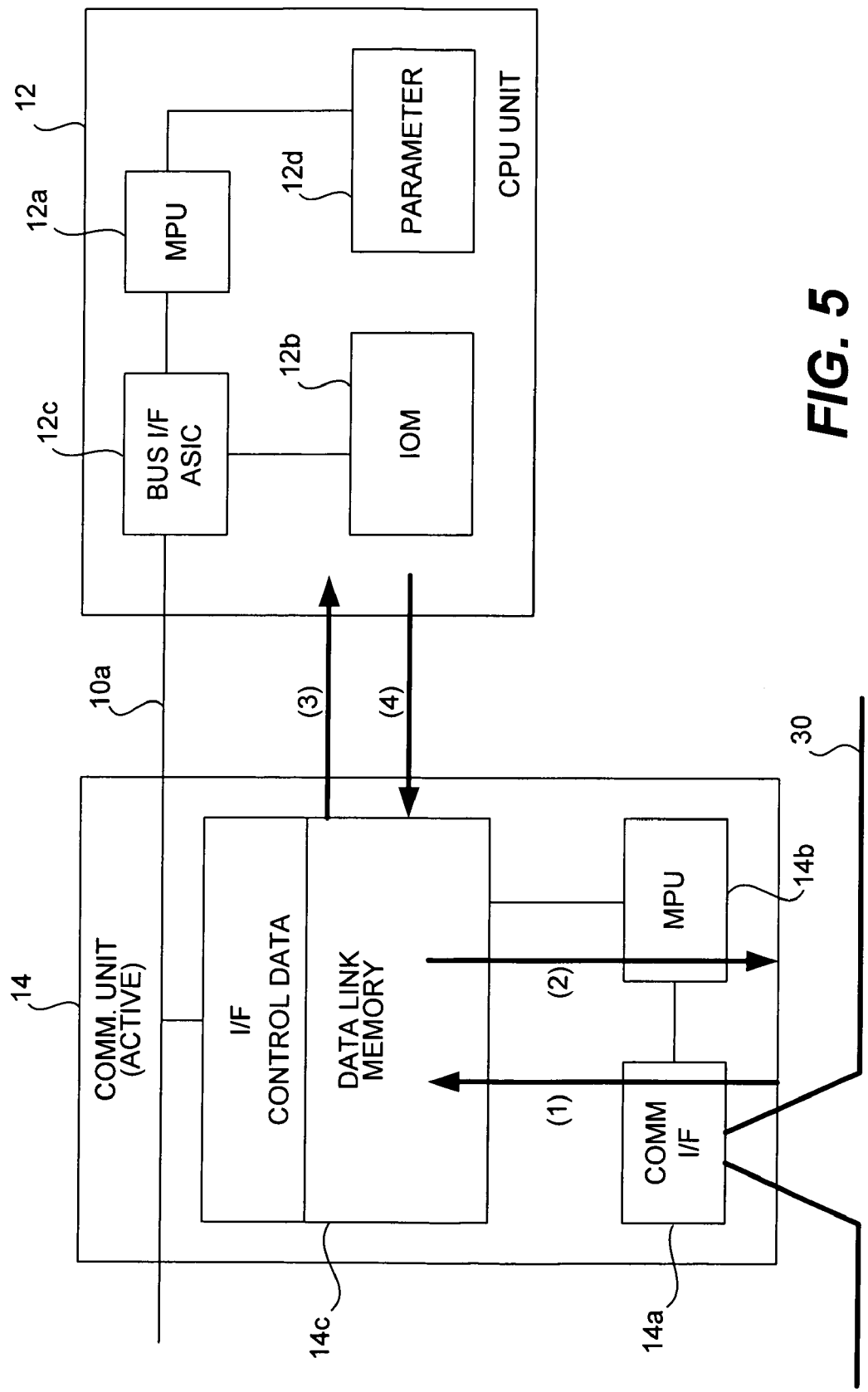
FIG. 5 is a block diagram for showing the operations of the communication unit in the active mode.

The data-link processing by the second communicating unit 14 after being switched to the active mode is carried out as shown in FIG. 5. Firstly (1), data traveling through the network (in the communication route 30) are obtained through the communication interface 14a and stored at a specified portion of the data link memory area in the memory 14c. Next (2), transmission data which have been stored at another area are transmitted to a specified addressee through the communication route 30.

Thereafter, while the CPU unit 12 carries out the IO-refresh, data are exchanged between the second communication unit 14 and the CPU unit 12 in the order of (3) and (4) as shown in FIG. 5. The sequence (1), (2), (3) and (4) is thereafter repeatedly carried out.

Immediately after being switched from the standby mode to the active mode, the second communication unit 14 reads out the data link setting stored in the CPU unit 12. Thus, it can start the data link processing with the same setting as the first communication unit 13 which has been active until then. Since the initialization process at the time of the restart includes a memory-clear operation, incorrect data may be in the memory 14c before the data link processing is started. If data are transmitted under this condition, this can cause erroneous operations. For this reason, the processing (2) described above is omitted immediately after the restart.

Next, the operations at the system start-up time of such a PLC will be explained. Address data (such as node numbers and unit numbers) set for individual units on a same network are usually required to be unique. If power is switched on while the same unit number or node address is set to different units, a "duplicated use error" is generated. Thus, according to an embodiment of this invention, the setting tool 31 is used to store the unit number of the duplicating communication unit at a specified memory area within the CPU unit 12 and, after it is arranged such that the CPU unit 12 will not check the duplicated use of that unit number, the power source of the PLC is switched off and on. Another possible method of obviating the duplicated use error is to cancel the generated duplicated use error by an operation of the setting tool 31 and the power source of the PLC is not switched off and on. In this manner, there result two communication units having the same node number and the same unit number.

Next, it is determined which of the doubled communication units is to be used in the active mode and which is to be used in the standby mode. It does not matter how the choice is made and there is no problem no matter how the choice is made. The choice may be made according to their set positions. For example, the communication unit with a younger rack number or slot number may be selected as one to be operated in the active mode. It goes without saying that the opposite choice is equally acceptable. The choice may be made by a mode-setting command from the CPU unit 12.

Next, communication parameters necessary for carrying out data link functions (such as data link setting) are set, but the method of setting is the same as in the case of prior art communication units.

For recovering from an abnormal doubling condition (wherein either of the communication units in the active and standby conditions is not operating normally), an online unit exchange operation must be carried out to exchange the faulty communication unit with a normal communication unit. If an abnormal condition occurs on the side of the active communicating unit, the other communicating unit in the standby condition is activated and resumes the on-going communications, as explained above. For returning to the normal doubled-up condition in such a situation, an online exchange process is carried out on the unit in the abnormal condition. The replacing unit is started up in the standby mode. If an abnormal condition occurs on the side of the communication unit in the standby condition, the active and standby conditions are not switched and the active communication unit continues to be used for communications. In this case, too, an online exchange is carried out on the unit in the abnormal condition and the replacing unit is started up in the standby mode.

The communication of an abnormal condition from a communication unit to the CPU unit may be carried out by writing the unit abnormality data item detected by the communication unit in a common memory (such as memories 13c and 14c in FIG. 2) shared with the CPU unit such that it can be read out by the CPU unit.

As explained above, not only are two communication units provided according to this invention but also data for identifying them are set to be the same and only one of them in the active mode is allowed to carry out normal communications and transmission and reception of data. Thus, the load on the CPU unit remains about the same as if there were only one communicating unit and user programs can be as simple as if there were only one communicating unit while the reliability of the system can be improved by the use of the duplicating communication units.

What is claimed is:

1. A programmable controller comprising two communication units connected to a same network and a CPU unit that controls said two communication units;
   wherein said CPU has a checking function for checking, when power is switched on, whether or not same communication unit number has been set to different communication units of said programmable controller, and generating an error signal if same communication unit number has been set to different communication units of said programmable controller;
   wherein said CPU is prevented from executing said checking function regarding a specified communication unit number that is stored at a specified memory area whereby no error signal is generated when power is switched on although said specified communication unit number is set on two or more communication units of said programmable controller;
   wherein said two communication units are both identified by same identifying data including unit number and function such that one thereof operates in an active mode and the other thereof operates in a standby mode;
   wherein each of said communication units, when in said active mode, operates to carry out data exchanges with said CPU unit and other nodes connected to said network;
   wherein each of said communication units, when in said standby mode, in prevented from carrying out any data exchange with other nodes connected to said network; and
   wherein the communication unit in said standby mode is switched to said active mode and carries out the data exchange if the communication unit in said active mode fails.

2. The programmable controller of claim 1 wherein said communication unit in said standby mode is switched to said active mode in response to a command from said CPU unit.

3. The programmable controller of claim 1:
wherein the communication unit in said active mode functions to carry out the data exchanges with said CPU unit and the other nodes by data link operations in a suitable order;
wherein said CPU unit stores parameters which are necessary for said data link operations; and
wherein the communication unit in said standby mode which is switched to said active mode becomes capable of carrying on said data link operations by receiving said parameters from said CPU unit.

4. The programmable controller of claim 2:
wherein the communication unit in said active mode functions to carry out the data exchanges with said CPU unit and the other nodes by data link operations in a suitable order;
wherein said CPU unit stores parameters which are necessary for said data link operations; and
wherein the communication unit in said standby mode which is switched to said active mode becomes capable of carrying on said data link operations by receiving said parameters from said CPU unit.

5. The programmable controller of claim 1:
wherein the communication unit in said active mode functions to carry out the data exchanges with said CPU unit and the other nodes by data link operations in a suitable order; and
wherein the communication unit which has switched from said standby mode to said active mode does not transmit data to the other nodes in the first data link operation after switching from said standby mode to said active mode.

6. The programmable controller of claim 2:
wherein the communication unit in said active mode functions to carry out the data exchanges with said CPU unit and the other nodes by data link operations in a suitable order; and
wherein the communication unit which has switched from said standby mode to said active mode does not transmit data to the other nodes in the first data link operation after switching from said standby mode to said active mode.

7. The programmable controller of claim 3 wherein the communication unit which has switched from said standby mode to said active mode does not transmit data to the other nodes in the first data link operation after switching from said standby mode to said active mode.

8. The programmable controller of claim 4 wherein the communication unit which has switched from said standby mode to said active mode does not transmit data to the other nodes in the first data link operation after switching from said standby mode to said active mode.

9. A CPU unit of a programmable controller which comprises two communication units which are both identified by same identifying data including unit number and are connected to a same network, said CPU unit comprising:
means for exchanging data with other nodes through one of said communication units in an active mode but not through the other of said communication units in a standby mode, said other nodes being connected to said same network; and
means for judging presence of an abnormal condition of said communication units and, if the one communication unit in said active mode is thereby judged to have failed with an abnormal condition and the other communication unit in said standby mode is judged to be functioning normally, starting up the other communication unit in said standby mode into said active mode;
wherein said CPU units controls said two communication units;
wherein said CPU has a checking function for checking, when power is switched on, whether or not same communication unit number has been set to different communication units of said programmable controller, and generating an error signal if same communication unit number has been set to different communication units of said programmable controller; and
wherein said CPU is prevented from executing said checking function regarding a specified communication unit number that is stored at a specified memory area whereby no error signal is generated when power is switched on although said specified communication unit number is set on two or more communication units of said programmable controller.

10. A communication unit in a programmable controller, said programmable controller including two communication units structured alike and connected to a same network and a CPU unit that controls said two communication units, said communication unit being one of said two communication units, said two communication units being both identified by same identifying data including unit number, said communication unit comprising:
mode-setting command receiving means for receiving a mode-setting command from said CPU unit; and
data-exchanging means for exchanging data with said CPU unit and with other nodes connected to said same network if said mode-setting command sets said communication unit in an active mode, said data-exchanging means being prevented from exchanging data with said other nodes connected to said same network if said mode-setting command sets said communication unit in a standby mode;
wherein said CPU has a checking function for checking, when power is switched on, whether or not same communication unit number has been set to different communication units of said programmable controller, and generating an error signal if same communication unit number has been set to different communication units of said programmable controller; and
wherein said CPU is prevented from executing said checking function regarding a specified communication unit number that is stored at a specified memory area whereby no error signal is generated when power is switched on although said specified communication unit number is set on two or more communication units of said programmable controller.

11. A method of controlling a programmable controller comprising two communication units connected to a same network and a CPU unit that controls said two communication units, said method comprising the steps of:
assigning same unit-identifying data including unit number to both of said two communication units;
causing one of said communication units in an active mode to carry out data exchanges with said CPU unit and other nodes connected to said same network;
preventing the other of said communicating units in a standby mode from carrying out data exchanges with said other nodes; and
switching the other communicating unit in said standby mode to said active mode, if the one communication unit in said active mode fails, and causing said other communication unit to carry out said data exchanges;

wherein said CPU has a checking function for checking, when power is switched on, whether or not same communication unit number has been set to different communication units of said programmable controller, and generating an error signal if same communication unit number has been set to different communication units of said programmable controller;

wherein said CPU is prevented from executing said checking function regarding a specified communication unit number that is stored at a specified memory area whereby no error signal is generated when power is switched on although said specified communication unit number is set on two or more communication units of said programmable controller.

* * * * *